(12) United States Patent
Navalpotro

(10) Patent No.: US 8,551,915 B2
(45) Date of Patent: Oct. 8, 2013

(54) METHOD FOR PRODUCTION OF VINASSES-DERIVED PRODUCT

(75) Inventor: Daniel Irisarri Navalpotro, Laukiz Vizcaya (ES)

(73) Assignee: HPD Process Engineering, S.A. (ES)

( * ) Notice: Subject to any disclaimer, the term of this patent is extended or adjusted under 35 U.S.C. 154(b) by 715 days.

(21) Appl. No.: 12/537,153

(22) Filed: Aug. 6, 2009

(65) Prior Publication Data

US 2009/0298690 A1 Dec. 3, 2009

Related U.S. Application Data

(63) Continuation-in-part of application No. 10/565,459, filed as application No. PCT/ES2004/000322 on Jul. 6, 2004, now abandoned.

(30) Foreign Application Priority Data

Jul. 23, 2003 (WO) .................. PCT/ES03/00381

(51) Int. Cl.
*A01N 63/00* (2006.01)

(52) U.S. Cl.
USPC .................. 504/117; 504/116.1; 424/470

(58) Field of Classification Search
USPC ................. 504/117, 116.1; 424/470
See application file for complete search history.

(56) References Cited

U.S. PATENT DOCUMENTS

| | | |
|---|---|---|
| 5,545,418 A | 8/1996 | Iritani |
| 2003/0022790 A1 | 1/2003 | Hero et al. |
| 2006/0217267 A1 * | 9/2006 | Irisarri Navalpotro ....... 504/117 |

FOREIGN PATENT DOCUMENTS

| | | | |
|---|---|---|---|
| CA | 2287089 A1 | * | 8/2000 |
| EP | 0117800 A1 | * | 9/1984 |
| EP | 1988169 Al | | 5/2008 |
| ES | 2113820 | | 5/1998 |
| ES | 2158751 | | 9/2001 |
| GB | 1148307 | * | 4/1969 |
| GB | 1148307 A | | 4/1969 |
| JP | 5194067 A | | 8/1993 |
| JP | 9263473 A | | 10/1997 |
| JP | 9263473 A | * | 10/1997 |
| WO | 2008009083 | | 1/2008 |

\* cited by examiner

*Primary Examiner* — Fereydoun G Sajjadi
*Assistant Examiner* — Courtney Brown
(74) *Attorney, Agent, or Firm* — Fulwider Patton LLP

(57) ABSTRACT

The present invention provides a product for agricultural use in the form of granules or pellets, characterized by comprising at least 30% (w/w) of vinasses and/or sludge measured as a dry extract of vinasses and/or sludge, and an organic or inorganic solid support. In addition, the present invention provides a procedure for producing said product, its use in agriculture, stockbreeding or as biodiesel.

5 Claims, No Drawings

METHOD FOR PRODUCTION OF VINASSES-DERIVED PRODUCT

CROSS-REFERENCES TO RELATED APPLICATIONS

This application is a continuation-in-part of U.S. application Ser. No. 10/565,459, which is the National Stage of International Application No. PCT/ES04/00322, filed Jul. 6, 2004, which claims priority to International Application No. PCT/ES03/00381, filed Jul. 23, 2003. The contents of these applications are fully incorporated herein by reference.

TECHNICAL FIELD OF THE INVENTION

The present invention is related to a product containing at least 30% highly concentrated vinasses and to a method for its manufacture, framed in the field of methods of recycling by-products of distillation; more specifically, methods of recycling vinasses.

PRIOR STATE OF THE ART

This is a continuation in part of U.S. application Ser. No. 10/565,459.

The term "vinasses" refers to effluents produced in distilleries of any type and, specifically, effluents obtained in the process of fermenting sugar cane or beet. These effluents have a variable qualitative and quantitative composition, but generally contain water, metal ions, yeasts, remainders of non-fermentable sugars, lignin, sulphates and other sulphur compounds and mainly organic material composed of heterogeneous polymers. In the context of the present invention, the term "recycled vinasses" refers to any of such effluents, harvested from the distillation tank and fully or partially processed for its industrial application.

The standard procedures for industrial production of ethanol from sugar cane comprise the following general steps:

Grinding the sugar cane to obtain its juice;

Concentrating said juice until obtaining a solution with a 20-30% content of insolubles diluted in water to 50%; and Fermenting, in a manner that varies in each distillery, wherein said diluted solution is added yeast in an amount sufficient to ferment sugars and sulphuric acid to lower the pH (to approximately 3.7-3.8), thereby producing alcohols like wine, containing mainly ethanol and unfermented products.

Once the wine is distilled, these procedures yield residual effluents loaded with unfermented products known generically as vinasses. Vinasses are produced in large quantities: for each litre of alcohol, approximately 12-14 litres of vinasses are produced. Considering that a medium-sized distillery produces about 50,000 litres of alcohol per day, the daily production of residual effluents amounts to 700,000 litres, which for at least 250 days a year implies the production of about 175,000,000 litres (175,000 m$^3$) of residues a year. Vinasses are highly pollutant due to their high demand of oxygen; one day of industrial activity of a distillery pollutes as much as a city of 500,000 persons.

The most common form of elimination of these residual effluents is uncontrolled discharge in rivers, lakes or seas, which causes serious harm to the environment. Hitherto, when the distillery is located near a plantation, its residues are used to water the crop, despite its unpleasant odour and cost of transport. Thus, ridding of vinasses is a problematic environmental challenge for the industry.

Several solutions have been proposed involving the re-utilisation of vinasses in various technical fields. In recent years, procedures for processing said liquid vinasses have been developed in various industrial sectors, such as ligno-sulphates (see Spanish Patent ES 2113820) and other polymeric materials (see Spanish Patent ES 2158751). More specifically, Spanish Patent ES 2113820 describes the production of lignosulphates from liquid vinasses applicable in the industry as a binding agent for manufacturing ceramic and refractory items, as a binding agent in animal food, ground stabilisation, production of light aggregates for civil construction work, in the manufacture of glues, etc. Likewise, Spanish Patent ES 2158751 describes a procedure for obtaining polymerical complexes from liquid vinasses with industrial application in the manufacture of water reducers, sprayers, tensioactive products, adhesives, binders, etc.

However, production of vinasses greatly exceeds their demand. Therefore, finding new applications for these residues remains a priority.

The re-utilisation of vinasses as produced in distilleries, i.e. untreated, has been performed in the agricultural sector in an uncontrolled manner, as explained above. The use of said unprocessed vinasses in agricultural applications has serious drawbacks. Research undertaken by researchers in the Institute of Sea Technology and Nutrition (Instituto Tecnológico del mar y los Alimentos; AZTI-Tecnalia) shows that pollutants in vinasses result from fermentation of the organic matter. Vinasses ferment almost spontaneously, producing very unpleasant sulphurous odours that are highly polluting. Characteristically, vinasses exhibit a high chemical oxygen demand (COD) and biological oxygen demand (BOD) due to their great ability to capture oxygen from the receptor medium. Hence, dumping vinasses directly to agricultural soil produces a significant harm to the living conditions of surrounding flora and fauna.

Vinasses leave the distillation column in concentrations ranging from 2% to 12%, approximately, and are later concentrated in the same distillation plant by evaporation, using the latent heat of the distillery, or in separate installations. This evaporation usually does not reach beyond 50% (w/w) in concentrated dry matter and therefore, vinasses are released as liquid from distillation plats. Liquid vinasses present several disadvantages for their recycling as fertilizers. In dry weather periods, liquid vinasses can be used by mixing them with solid granules at the time of spreading over the agricultural fields in an operation that is considerably more complex than just the mixing of granules, involving the use of deposits to contain them on the same tractor with the mechanical granule hopper. In rainy weather this cannot be done, as rainwater will instantly dissolve the liquid.

Conversely, when the vinasses are applied in a controlled manner in agriculture, its fermentation is beneficial to plants due to the high content in low molecular mass polymerical complexes, such as organic acids, glycerine, carboxyl groups, etc. These polymers contribute to the retention of water and organic matter, and provide structure to the soil. Therefore helping to complex and chelate the nutrients and improving the cationic exchange capacity (CEC). The inorganic content, mainly potassium and smaller amounts of nitrogen and phosphorus, as well as some microelements, improve the nutrition of plants. Soil microorganisms transform proteins contained in vinasses into amino acids that can be readily used by plants. Plants, as humans, need amino acids to carry out vital functions.

Therefore it would be desirable to develop a method of recycling of vinasses that is not contaminant and allows for the reutilization of large volumes of vinasses into an agricultural product.

In this context, the present inventors have developed a product and a method of production of said product that enables the employment of vinasses as fertilizers, being not only not polluting but, in fact, beneficial. The present invention implies a number of advantages over the prior art:

Large volumes of vinasses are reutilised, therefore reducing environmental impact;

The agricultural product obtained by the method of the invention is easily applied and is an ecological material as per current legislation (EEC Regulation 2092/91);

The costs of obtaining the agricultural product and applying it are both reduced, obtaining additional income by its commercialisation.

OBJECT OF THE INVENTION

One object of the present invention is a granulated product containing recycled vinasses comprising:
i) at least 30% (w/w) of vinasses, concentrated between 40% and 75% and
ii) a solid support.

Another object of the present invention is a method for the manufacturing of a granulated product containing recycled vinasses wherein said vinasses are concentrated to between 40% and 75% of solid matter.

Another object of the present invention is the use of the granulated product containing recycled concentrated vinasses as a fertilizer, in stockbreeding or as biodiesel.

DESCRIPTION OF THE INVENTION

The present invention provides a product containing recycled vinasses in the form of granules or pellets characterised in that it comprises at least 30% (w/w) vinasses and an organic or inorganic solid support (referred to hereinafter as the "product of the invention").

Said product is unique in the field of recycling vinasses because of its high content in vinasses, which allows the recycling of a much larger quantity of this pollutant by-product. In a preferred embodiment, the product of the invention comprises 30-75% (w/w) vinasses the remaining 70-5% being the solid support needed to obtain the product in the form of a granule or pellet. Characteristically, the vinasses used in this product are highly concentrated, at least 40% but preferably 60% in dry matter.

In a preferred embodiment, the product of the invention comprises 50% (w/w) of vinasses, concentrated up to 60%, the remaining 50% being the solid support.

In another preferred embodiment, the granules or pellets of the granulated product of the invention are at least 8 mm in diameter.

Another aspect of the present invention is a method for the manufacture of the granulated product of the invention, characterised in that it comprises a step of addition of vinasses, as a solid or a concentrated liquid, to a pelletable solid support for granulation.

In a particular embodiment, the method for the manufacture of the product of the invention comprises a step of adding the concentrated liquid vinasses in at least 40% (w/w) to a pelletable solid support.

Vinasses concentrated up to 50% in distilleries can be dried and turned into powder. The present invention provides a way of recycling such powder as a product for use in agriculture, stockbreeding or as biofuel by incorporating it with a pelletable solid support.

Consequently, in a particular embodiment, the method for manufacturing the product of the present invention comprises a step for adding water, wherein the concentrated vinasses are added as powder to the solid support.

The granulated product is obtained more easily the greater the concentration of the vinasses, or the more powdered vinasses are used. The granulation or pelletisation will be performed by any conventional procedure known to an expert in the field, in any granulation/pelletisation installation commonly used in the state of the art. Normally, a mechanical device is used for forming the granules/pellets in which the vinasses, liquid or powder, and/or the sludge, are mixed with the solid support and a drying device in which the granules/pellets are dried after they are formed.

The amount of vinasses, liquid or in powder, and solid support must be considered in order to calculate and know the percentage of concentrated vinasses contained in the granules/pellets.

The function of the aforementioned solid support, in addition to favouring the granulation or pelletisation operation, is to provide a complementary composition of organic or inorganic matter beneficial to plants and crops. Thus, a suitable organic solid support appropriate for the present invention due to its energetic or agronomic interest is, for example, shell rice, bagazo (solid residues after the sugar cane has been mashed to extract the juice), compost, chicken manure, etc. all of them grinded and powdered. Similarly, suitable inorganic solid supports appropriate for the present invention are mineral materials with agronomic interest due to their component or qualities, as for example clays, which further provide the advantage of increasing the specific gravity of the product, or a phosphoric rock, rich in phosphorus, or Silica (Silicium dioxide), or Zeolita providing moisture retention to the granulate an Silica, and other mineral materials, all of them grinded and powdered. Likewise, when the product is designed for its use in stockbreeding, the suitable solid support may be chosen among those providing the necessary oligoelements to the animal, for example iron, magnesium, calcium copper, or zinc salts. These minerals will complement the nutritional content of vinasses in the final product.

Another aspect of the invention is the use of the product of the invention in agriculture, preferably as a fertiliser, a nutrient enhancer, a soil conditioner, a desalinisation agent, a complexing or chelating agent for nutrients, a soil organic matter stabiliser, a mixture enhancer, a pH improver and regulator, a cationic exchange capacity improver, or as an organic matter of almost instant availability as well as in stockbreeding or as biofuel.

EXAMPLES

Example 1

Granulated Product for Use as Fertilizer

In the manufacture of this granulated fertilizer vinasses are concentrated at 60% dry weight.

Components:

61% of vinasses at 60% Concentration
39% grinded bagazo from sugar cane+clay
Analysis

| | |
|---|---|
| MOISTURE | 0.80% |
| ASHES | 42.50% |
| ORGANIC MATTER | 56.70% |
| TOTAL | 100.00% |
| ORGANIC CARBON | 28.30% |
| MOISTURE RETENTION | 80.00% |
| C.I.C. as meq/100 gr. | 37.00 meq/100 gr. |
| pH | 4.83 |
| SPECIFIC GRAVITY | 0.79 gr./c.c. |
| C/N RELATION | 17.00 |
| NITROGEN | 1.71% |
| PHOSPHORUM as P2O5 | 0.17% |
| POTASSIUM as K2O | 5.97% |
| MAGNESSIUM as MgO | 2.46% |
| IRON | 3.00% |
| SILICIUM as SIO2 | 22.5% |

Wet bulb thermometer: 59° Celsius
Dry bulb thermometer: 98° Celsius
BAGAZO means solid residues after the sugar cane has been mashed to extract the juice Example 2

Granulated Product for Use as Fertilizer

Components:

53% sludge residue from bottom part of a tank containing vinasses.
47% SHELL RICE+CLAY
Analysis

| | |
|---|---|
| MOISTURE | 4.16% |
| ASHES | 40.30% |
| ORGANIC MATTER | 55.54% |
| TOTAL | 100.00% |
| ORGANIC CARBON | 24.50% |
| MOISTURE RETENTION | 77.00% |
| C.I.C. as meq/100 gr. | 29.00 meq/100 gr. |
| pH | 5.02 |
| SPECIFIC GRAVITY | 0.68 gr./c.c. |
| C/N RELATION | 30.00 |
| NITROGEN | 0.81% |
| PHOSPHORUM as P2O5 | 0.19% |
| POTASSIUM as K2O | 4.34% |
| MAGNESSIUM as MgO | 0.97% |
| IRON | 1.65% |
| CALCIUM as CAO | 3.87% |
| SULFUR | 3.09% |
| SILICIUM as SIO2 | 22.5% |

Wet bulb thermometer: 60° Celsius
Dry bulb thermometer: 102° Celsius

Example 3

Granulated Product for Use as Biofuel

For its use as biofuel, the pellets must be bigger that 8 mm diameter.

Raw Materials:

53% sludge containing vinasses from the bottom part of the tanks
47% shell rice+bagazo from sugar cane grinded
Analysis

| | |
|---|---|
| MOISTURE | 4.10% |
| ASHES | 28.90% |
| ORGANIC MATTER | 67.00% |
| TOTAL | 100.00% |
| ORGANIC CARBON | 26.20% |
| MOISTURE RETENTION | 88.00% |
| C.I.C. as meq/100 gr. | 22.00 meq/100 gr. |
| pH | 4.89 |
| SPECIFIC GRAVITY | 0.62 gr./c.c. |
| C/N RELATION | 22.00 |
| NITROGEN | 1.20% |
| PHOSPHORUM as P2O5 | 0.16% |
| POTASSIUM as K2O | 6.05% |
| MAGNESSIUM as MgO | 1.28% |
| IRON | 0.37% |
| CALCIUM as CAO | 2.87% |
| SULFUR | 3.00% |
| SILICIUM as SIO2 | 7.27% |

Wet bulb thermometer: 60° Celsius
Dry bulb thermometer: 102° Celsius

Example 4

Granulated Product for Use as Biofuel

For its use as biofuel, the pellets must be bigger that 8 mm diameter raw materials:

55% vinasse at 60% concentration
45% shell rice+bagazo from sugar cane grinded
Analysis

| | |
|---|---|
| MOISTURE | 1.90% |
| ASHES | 25.90% |
| ORGANIC MATTER | 72.20% |
| TOTAL | 100.00% |
| ORGANIC CARBON | 28.60% |
| MOISTURE RETENTION | 92.00% |
| C.I.C. as meq/100 gr. | 28.00 meq/100 gr. |
| pH | 5.31 |
| SPECIFIC GRAVITY | 0.61 gr./c.c. |
| C/N RELATION | 21.00 |
| NITROGEN | 1.36% |
| PHOSPHORUM as P2O5 | 0.21% |
| POTASSIUM as K2O | 4.78% |
| MAGNESSIUM as MgO | 1.28% |
| IRON | 0.59% |
| CALCIUM as CAO | 1.59% |
| SULFUR | 1.34% |
| SILICIUM as SIO2 | 9.37% |

Wet bulb thermometer: 59° Celsius
Dry bulb thermometer: 102° Celsius

Example 5

Granulated Product for Use in Stockbreeding

Raw Materials:
54% vinasse 60% concentrated
46% shell rice+bagazo from sugar cane grinded+clay+boron acid+zinc sulfate
Analysis

| | |
|---|---|
| MOISTURE | 5.95% |
| ASHES | 46.10% |
| ORGANIC MATTER | 47.95% |
| TOTAL | 100.00% |
| ORGANIC CARBON | 23.20% |
| MOISTURE RETENTION | 68.20% |
| C.I.C. as meq/100 gr. | 18.60 meq/100 gr. |
| pH | 6.10 |
| SPECIFIC GRAVITY | 0.75 gr./c.c. |
| C/N RELATION | 28.00 |
| NITROGEN | 0.83% |
| PHOSPHORUM as P2O5 | 0.20% |
| POTASSIUM as K2O | 5.13% |
| MAGNESSIUM as MgO | 1.35% |
| IRON | 1.36% |
| CALCIUM as CaO | 2.67% |
| SULFUR | 2.78% |
| BORON | 1.61% |
| ZINC | 2.63% |
| SILICIUM as SIO2 | 22.5% |

Wet bulb thermometer: 58° Celsius
Dry bulb thermometer: 98° Celsius

The invention claimed is:

1. Method for the manufacture of a granulated product containing recycled vinasses comprising the addition of vinasses to solid support, wherein said vinasses are concentrated between 40% and 75%, and further comprising the steps of:
   a) Optionally weighting and mixing the solid support,
   b) Optionally adding water,
   c) Kneading the concentrated vinasses with the solid support to form a dough,
   d) Shaking the dough obtained in step c),
   e) Chopping the dough shaken in step d),
   f) Granulating the chopped dough of step e) in a granulating cylinder, and
   g) Drying the granules obtained in step f) in a rotating oven.

2. Method according to claim 1, wherein the added vinasses are concentrated to at least 60%.

3. Method according to claim 1, wherein the concentrated vinasses are added as powder to the solid support.

4. Method according to claim 1, characterized in that the solid support for granulation is a suitable organic substance.

5. Method according to claim 1, characterized in that the solid support for granulation is a suitable inorganic substance.

* * * * *